United States Patent [19]

Hargest

[11] Patent Number: 5,229,766
[45] Date of Patent: Jul. 20, 1993

[54] MARINE FUEL TANK POLLUTION CONTROL APPARATUS

[76] Inventor: Thomas S. Hargest, P.O. Box 21118, Charleston, S.C. 29413

[21] Appl. No.: 734,261

[22] Filed: Jul. 22, 1991

[51] Int. Cl.[5] ............................................. G08B 23/00
[52] U.S. Cl. .................................... 340/984; 116/112; 340/616
[58] Field of Search ............... 340/984, 616, 623, 624; 220/373, 374, 205; 116/109, 110, 112; 137/551, 558

[56] References Cited

U.S. PATENT DOCUMENTS

| | | |
|---|---|---|
| 258,872 | 6/1882 | Ashcroft . |
| 912,970 | 2/1909 | Marsh . |
| 973,772 | 10/1910 | Gedeon . |
| 1,348,015 | 7/1920 | Lee . |
| 1,727,733 | 9/1929 | Stovall . |
| 2,037,731 | 4/1936 | Mobley . |
| 2,061,175 | 11/1936 | Staber . |
| 2,093,575 | 9/1937 | Roberts . |
| 2,414,158 | 1/1947 | Mock . |
| 2,556,319 | 6/1951 | Davis . |
| 3,136,292 | 6/1964 | Mitchell . |
| 3,185,789 | 5/1965 | Gunther . |
| 3,204,230 | 8/1965 | Hosford, Jr. . |
| 3,306,007 | 2/1967 | Glasgow . |
| 3,680,044 | 7/1972 | Tsubouchi . |
| 3,849,771 | 11/1974 | Applin . |
| 3,857,350 | 12/1974 | Rohan ................... 116/112 |
| 3,955,945 | 5/1976 | Bauer . |
| 3,981,156 | 9/1976 | Modisette et al. . |
| 3,992,172 | 11/1976 | Clark . |
| 4,166,431 | 9/1979 | Pickering . |
| 4,376,490 | 3/1983 | Mizusaki . |
| 4,531,653 | 7/1985 | Sakata . |
| 4,533,910 | 8/1985 | Nagashima . |
| 4,630,749 | 12/1986 | Armstrong et al. . |
| 4,699,638 | 10/1987 | Harris . |
| 4,769,050 | 9/1988 | Shaw et al. . |
| 4,809,863 | 3/1989 | Woodcock et al. . |
| 4,821,022 | 4/1989 | Jannotta ................ 340/623 |
| 4,854,469 | 8/1989 | Hargest . |
| 4,963,169 | 10/1990 | Granville . |
| 5,023,608 | 6/1991 | Delisle, Jr. et al. ........ 340/984 |
| 5,028,910 | 7/1991 | Meacham et al. ........... 340/616 |

FOREIGN PATENT DOCUMENTS

| | | |
|---|---|---|
| 55-64148 | 5/1980 | Japan . |
| 912205 | 3/1982 | U.S.S.R. . |
| 1036341 | 8/1983 | U.S.S.R. . |
| 1068142 | 1/1984 | U.S.S.R. . |

Primary Examiner—Brent A. Swarthout
Attorney, Agent, or Firm—Dority & Manning

[57] ABSTRACT

A marine craft includes a pollution control device for marine fuel tanks. The pollution control device includes a compartment for receiving fuel that leaves the fuel tank headed toward the vent via the vent line. The volume of the compartment desirably holds more fuel than would be contained in the volume of the length of the vent line that extends from the fuel tank to the vent. The compartment has an inlet that communicates with the fuel tank via the vent line. The compartment has an outlet that communicates with the vent via the vent line. The device includes a guide tube disposed within the compartment for preventing direct transmission of fuel to the vent. The device includes a float member disposed within the guide tube for detecting fuel in the vent line. The device includes an alarm circuit activated when the float member is located at a predetermined position within the guide tube. The device includes a lifting arm connected to the float member and enabling the float member to be lifted to a position where the operative alarm circuit should activate a signal.

12 Claims, 6 Drawing Sheets

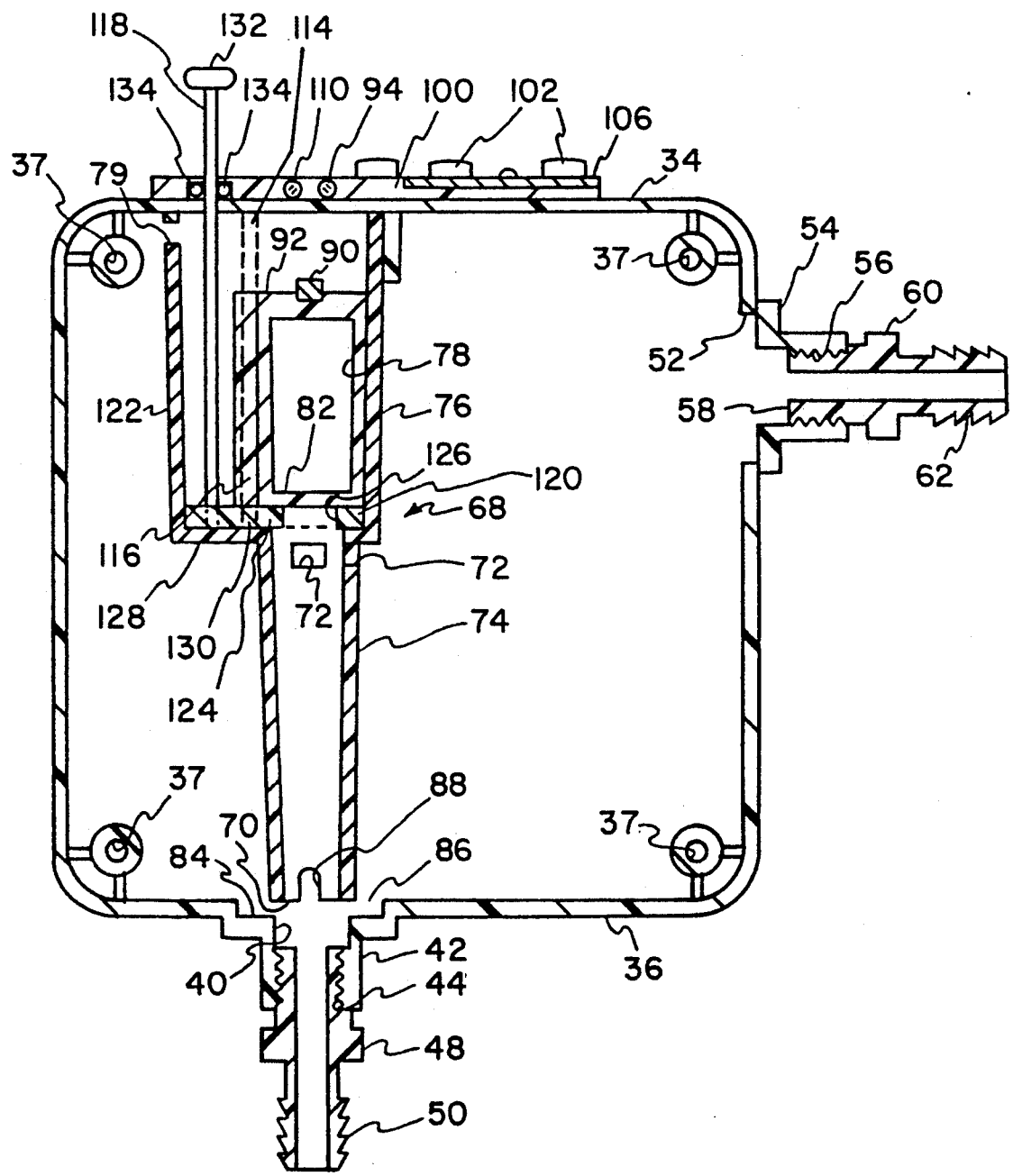
FIG. 4 (A,A)

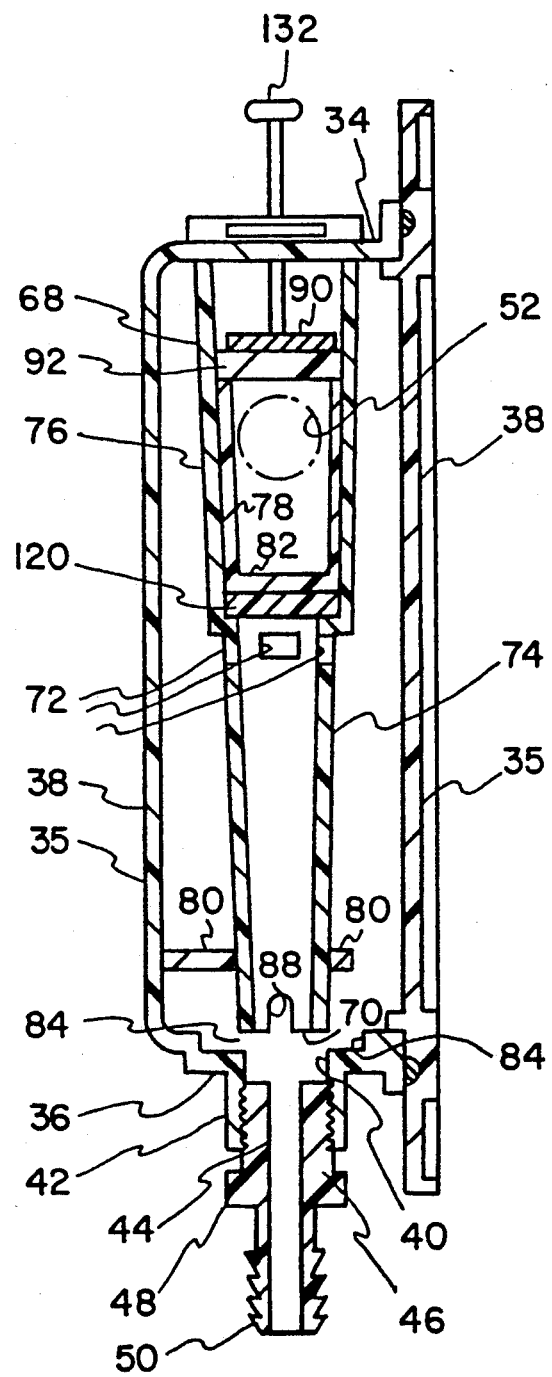
FIG. 5 (B,B)

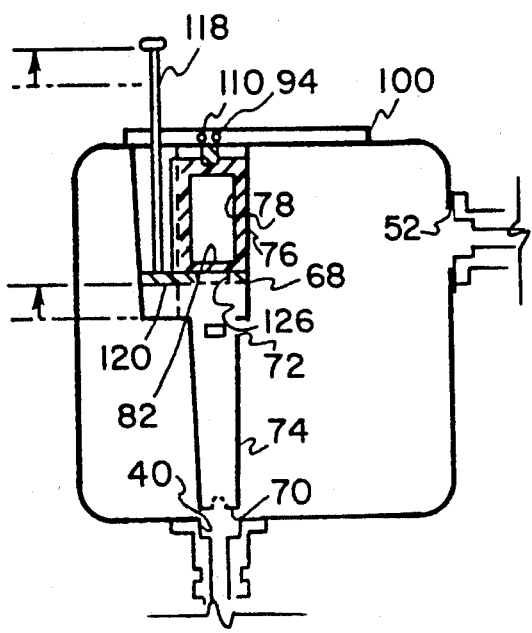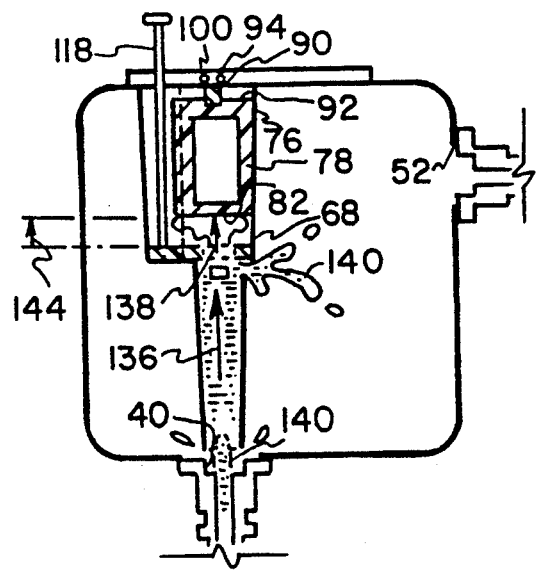
FIG. 6A  FIG. 6B
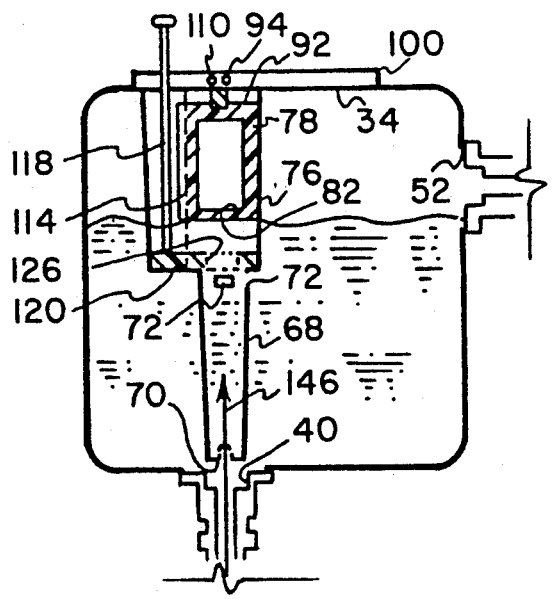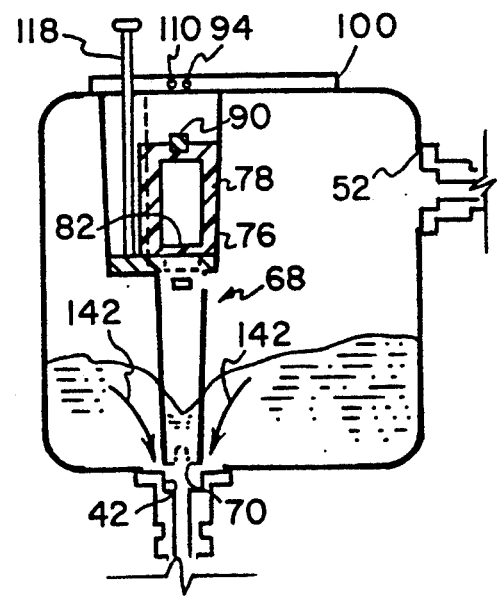
FIG. 6C  FIG. 6D 5,229,766

MARINE FUEL TANK POLLUTION CONTROL APPARATUS

BACKGROUND OF THE INVENTION

The present invention relates generally to a pollution control apparatus and particularly to an apparatus that prevents undesirable fuel discharge from a marine fuel tank.

Not all rainbows are beautiful. In particular, the rainbow produced by fuel spilled on this nation's waterways indicates an environmental hazard and thus constitutes one rainbow which is not beautiful.

All fuel systems for boats must be vented to permit fuel to flow to the engine and for filling of the fuel tanks. On boats with integrated fuel tanks, the vent is generally located on the exterior of the hull near the interior location of the tank. In most cases, the vent is observed when fueling to learn when the tank has been filled. For example, a tank full of fuel is indicated by ejection of fuel from the vent. However, ejection of fuel into any river, lake, bay, inlet, or harbor is against Federal Law and may result in a fine of up to several thousand dollars. When it is considered that there are millions of boats with integrated tanks, many with three or four tanks, which are fueled at least weekly, it can be estimated that millions of gallons of fuel are likely discharged into the waterways each year.

Two basic approaches have been taken to this problem. U.S. Pat. No. 4,963,169 to Granville and the Fuel/Air Separator sold by Racor Division of Parker Hannifin Corp., in Cleveland, Ohio, try to prevent fuel from spilling into the waterway during marine tank overflow by preventing fuel from exiting the vent line into the waterway. However, this may result in the tank overflowing from the fuel tank inlet. Such overflows can spill onto the deck, where they must be cleaned up with rags or washed overboard, both instances causing unwanted pollution.

U.S. Pat. No. 4,854,469 to the present inventor, provides small fuel reservoir with a window and a baffle configuration. The window enables the user to view the fuel in the reservoir and discontinue the fuel filling operation in time to prevent the fuel from overflowing the reservoir and out the vent line into the waterway. However, the reservoir must be located where the user can see the fuel entering the reservoir and know when to cease the fueling operation. The baffle configuration prevents the fuel entering the reservoir from directly accessing the reservoir's vent opening which connects to the boat's vent.

Water level indicating devices are disclosed in U.S. Pat. No. 258,872 to Ashcroft (water/steam separator) and U.S. Pat. No. 3,849,771 to Applin (swimming pool). Both devices use a floating member to trigger an alarm when the fluid level attains a predetermined level, and the Applin device includes a magnetic reed switch that is positioned manually to set the water level that triggers the alarm.

While the above described structures may be successful for their intended purpose, there is no teaching or suggestion of the present invention.

OBJECTS AND SUMMARY OF THE INVENTION

A primary object of this invention is to provide an improved fuel tank arrangement for marine use.

A further object of the present is to eliminate fuel tank overflow spillage of an estimated 2 million gallons of fuel each year from the fueling of recreational boats with built-in fuel tanks.

Another principal object of the present invention is to provide means that guards against a marine fuel tank fuel discharge caused by a sudden surge of fuel that would be of insufficient volume to fill the entire vent line of the fuel tank.

Still another principal object of the present invention is to provide means that guards against a marine fuel tank fuel discharge caused by a gradual heat expansion of fuel volume caused by the sun's heating effect.

Yet another principal object of the present invention is to provide means that guards against a marine fuel tank fuel discharge caused by a gradual foaming expansion of fuel volume caused by the foaming of fuel sloshing around inside the fuel tank when the boat is in rough water for example.

It is a further object of the present invention to provide a means for determining when a fuel tank is full without any liquid fuel escaping to the surroundings.

Yet another object of the present invention is to provide means in a marine fuel tank environment that performs the dual function of a fuel level indicating device and a fuel surge indicating device.

It is a still further object of this invention to provide a device for protecting the environment from pollution by controlling the discharge of the fuel from a fuel tank vent.

It is still another object of the present invention to provide a device for protecting the environment by controlling the discharge of the fuel from several fuel tank vents and determining when several fuel tanks are full without fuel escaping to the surroundings.

Yet another object of the invention is to provide a means for safely filling a marine fuel tank while at the same time conserving fuel.

A yet further principal object of the present invention is to provide means as described above that is effective notwithstanding the fact that one or more of the fuel tank, the vent line outlet, and the apparatus of the present invention itself, are obscured from the view of the person employing the apparatus of the present invention.

An additional further object of the present invention is to provide means for assuring that the means described above is operative in good working order to carry out the purpose of the present invention.

Additional objects and advantages of the invention will be set forth in part in the description which follows, and in part will be obvious from the description, or may be learned by practice of the invention.

To achieve the objects and in accordance with the purpose of the invention, as embodied and broadly described herein, the marine craft with the pollution control apparatus for marine fuel tanks is powered by an internal combustion engine consuming volatile liquid fuel. As embodied herein, the marine craft can include a boat which comprises a hull that supports an internal combustion engine for propelling the boat through the water. The boat can include a marine battery or another electric power source.

In further accordance with the present invention, the marine craft includes at least one fuel tank, and preferably more than one tank, for storing the liquid fuel to be consumed by the internal combustion engine. As embodied herein, the boat can have two fuel tanks supported by the hull. Each fuel tank defines a fuel tank chamber therewithin where fuel is to be stored. The fuel tank chamber is connected to an overboard vent via a vent line.

A means is provided for preventing liquid fuel from the fuel tank from being transmitted directly to the overboard vent via the fuel tank vent line. The fuel transmission preventing means intercepts and houses fuel that overflows from the fuel tank chamber via the vent line. As embodied herein, the fuel transmission preventing means can include an enclosed compartment that has a top wall, a bottom wall, and a side wall connecting the top and bottom walls. The fuel transmission preventing means has a fuel inlet opening that communicates with the fuel tank via the vent line. The fuel inlet opening can be defined in the bottom wall, which also can include a fitting that receives a standard vent line adaptor to which the vent line can be secured.

The fuel transmission preventing means can include an outlet opening that communicates with the overboard vent via the vent line. Vapor from the fuel tank can pass through the fuel transmission preventing means and exit through the overboard vent via the outlet opening, which can be defined in an upper portion of the fuel transmission preventing means. The compartment can define a fitting around the outlet opening and which receives a standard adaptor to which one end of a vent line can be secured, the opposite end of the vent line being connected to the overboard vent of the boat.

A means is provided for detecting fuel in the fuel transmission preventing means. As embodied herein, the fuel detecting means can include an elongated hollow fuel guide tube disposed within the fuel transmission preventing means. One end of the guide tube is opened and disposed in communication with the inlet of the fuel transmission preventing means. The guide tube defines at least one exit opening for permitting fuel entering the guide tube to exit the guide tube and be received within the fuel transmission preventing means.

The fuel detecting means can further include a float member disposed slidably within the upper portion of the guide tube, which forms a support surface on which the bottom of the float member can be carried within the guide tube. The float member has a density characteristic that enables it to be floatable in marine fuel with very minimal displacement of fuel so that the float member would float very close to the surface of a body of marine fuel.

A means is provided for signaling the detection of fuel in the fuel transmission preventing means. The fuel detection signaling means desirably is configured and located so as to operate in cooperation with the fuel detecting means. As embodied herein, the fuel detection signaling means can include a magnetic member, a magnetically actuatable electric switch, and an electric alarm circuit. A bar magnet can define the magnetic member and can be carried by the top of the float member. At least one magnetic reed switch can define the magnetically actuatable electric switch and is desirably disposed near enough to the guide tube so as to be actuatable by the magnetic member at a predetermined location of the float member within the guide tube. The electrical alarm circuit can include at least one reed switch and an electric powered alarm. The circuit is configured so that actuation of the reed switch provides electric power to activate the alarm. A direct current source of electricity, such as the marine battery carried by the boat, desirably is used for the purposes of powering the alarm in the circuit. The alarm can emit an audible signal, a visual signal, or both types of signals. Moreover, the electric circuit can include a second reed switch for purposes of redundancy and reliability.

A means is provided to maintain the proper alignment of the magnetic field of the magnetic member in order to ensure reliable activation of the magnetic reed switches. As embodied herein, the magnetic alignment means includes an elongated slotted opening defined along the length of the upper portion of the guide tube. The magnetic alignment means also includes a detent formed on one side of the float member and confined to slide within the elongated slot. Alternatively, the magnetic alignment means could include the configuration of the upper portion of the guide tube and the float member with a polygonal transverse cross-section.

The fuel detection signaling means can include a means for electrically powering the alarm for a predetermined time after the reed switch ceases to be actuated by the magnetic member. As embodied herein, this prolongation of the alarm signal can include an RC portion of the circuit which functions in conjunction with a transistor switch so as to maintain electric power connected to the alarm for a period of time after the reed switch ceases to be actuated by the magnetic member.

A means is provided for testing the operativeness of the fuel detection signaling means. As embodied herein, the testing means can include a lifting arm that is formed by an elongated plunger member attached at one end to a carriage member. A portion of the carriage member is disposed beneath the bottom surface of the float member within the upper portion of the guide tube. Another portion of the carriage member is slidably housed within an elongated channel member that is disposed adjacent the upper portion of the guide tube in the vicinity where the guide tube defines the elongated slot in which the detent of the float member is confined. The portion of the carriage member housed within the upper portion of the guide tube also includes an opening therethrough that is large enough to allow passage of liquid fuel but small enough to prevent the float member from passing therethrough. The opposite end of the plunger member includes a knob which can be manually grasped by the operator to lift the carriage member and the float member carried by the carriage member within the upper portion of the guide tube.

A means is provided for returning to the fuel tank chamber, liquid fuel which has overflowed from the fuel tank chamber via the vent line and been intercepted by the fuel transmission preventing means. The liquid fuel return means can include a recess defined in the bottom wall of the compartment which defines the fuel transmission preventing means. The recess funnels liquid fuel back into the inlet opening of the compartment from the main reservoir chamber of the compartment. The liquid fuel return means further can include an annular gap that is defined between the bottom wall of the compartment and the free end of the fuel guide tube. The annular gap provides unobstructed access to the fuel inlet opening from the main reservoir of the compartment. The liquid fuel return means can further include a plurality of elongated slots defined in the free end of the guide tube. Each slot provides additional drainage access for the liquid fuel that enters the compartment.

BRIEF DESCRIPTION OF THE DRAWINGS

FIG. 4 illustrates a cross-sectional view taken along the lines A—A of FIG. 3;

FIG. 5 illustrates a cross-sectional view taken along the lines B—B of FIG. 3;

FIG. 6A schematically illustrates operation of the testing of a preferred embodiment of the present invention shown in a cross-sectional view taken along the lines A—A of FIG. 3;

FIG. 6B schematically illustrates operation of a preferred embodiment of the present invention shown in a cross-sectional view taken along the lines A—A of FIG. 3 in response to a slug of fuel surging from the fuel tank;

FIG. 6C schematically illustrates operation of a preferred embodiment of the present invention shown in a cross-sectional view taken along the lines A—A of FIG. 3 in response to a gradual overflow of fuel from the fuel tank due to overfilling and/or heat expansion; and FIG. 6D schematically illustrates how a preferred embodiment of the present invention shown in a cross-fuel sectional view taken along the lines A—A of FIG. 3 drains back into the fuel tank after overfilling and/or heat expansion has caused fuel to enter the storage chamber of the present invention.

DESCRIPTION OF THE PREFERRED EMBODIMENTS

Reference now will be made in detail to the present preferred embodiments of the present invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention For instance, features illustrated or described as part of one embodiment, can be used on another embodiment to yield a still further embodiment. Thus, it is intended that the present invention cover the modifications and variations of this invention provided they come within the scope of the appended claims and their equivalents.

What is presently considered the preferred embodiment of the present invention, an example of which is illustrated in the accompanying drawings, now will be described.

A preferred embodiment of the present pollution control apparatus for marine fuel tanks is shown in FIGS. 1–6D and is represented generally by the numeral 10.

Figure 1:
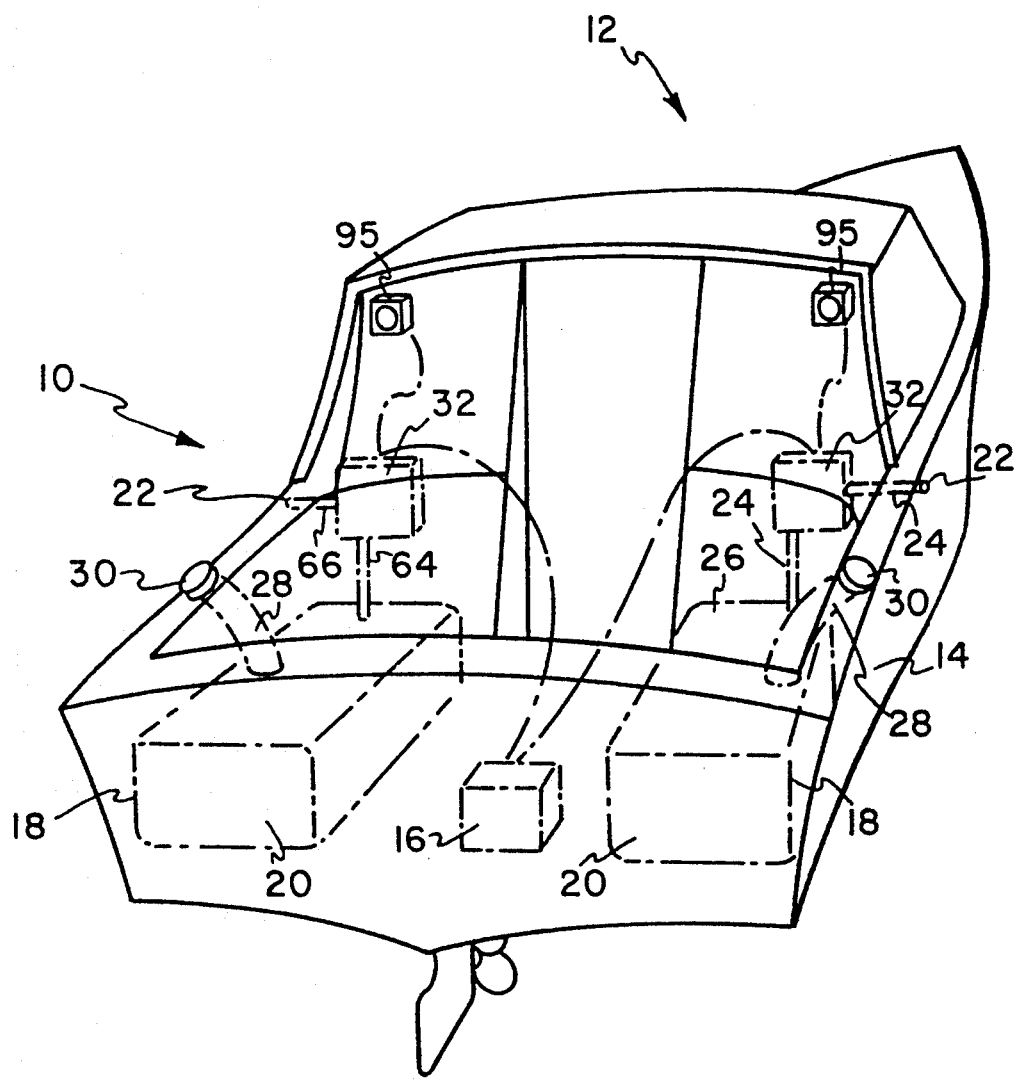
FIG. 1 schematically illustrates a perspective view of a preferred embodiment of the present invention.

In accordance with the fuel pollution control apparatus of the present invention, a marine craft powered by an internal combustion engine consuming volatile liquid fuel is shown for example in FIG. 1. The marine craft defines a boat indicated generally by the numeral 12, and boat 12 comprises a hull 14 that floats in water. An internal combustion engine (not shown) is supported by hull 14 for propelling boat 12 through the water. Boat 12 includes an electric power source such as a marine battery 16 used to start the internal combustion engine. The marine craft includes at least one fuel tank, and preferably more than one tank, for storing the liquid fuel to be consumed by the internal combustion engine. As embodied herein and shown in FIG. 1 for example, boat 12 has two fuel tanks 18 indicated in phantom and supported by hull 14. Each fuel tank 18 defines a fuel tank chamber 20 therewithin where fuel is to be stored.

As known in the art, a boat with a built-in fuel tank such as fuel tank 18, will also include an overboard vent 22 that is disposed above the water line of hull 14 and in the vicinity of fuel tanks 18 to provide effective venting for each fuel tank 18. Typically, a length of flexible tubing forms a fuel tank vent line that connects the overboard vent to the fuel tank chamber. As shown in FIG. 1 for example, a fuel tank chamber vent line 24 extends from an upper wall 26 of fuel tank 18 to an overboard vent 22 defined in an above-waterline section of hull 14. Vent line 24 connects fuel tank chamber 20 to overboard vent 22, which communicates to the atmosphere. A fuel tank chamber inlet nozzle 28 is shown in phantom for each fuel tank 18. A fuel tank cap 30 is provided to seal each nozzle 28 for each fuel tank 18.

Figure 2:
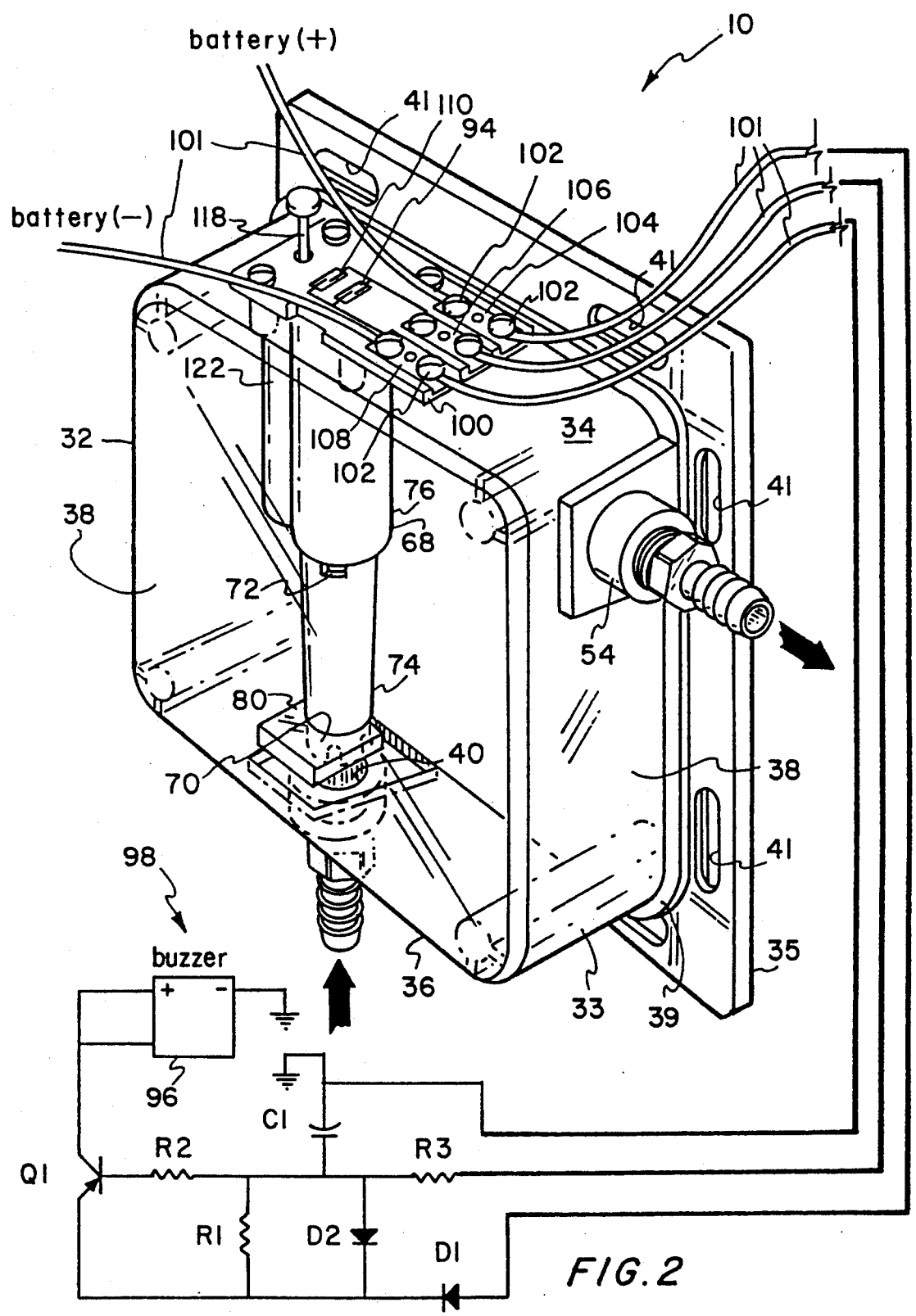
FIG. 2 schematically illustrates a perspective view of another preferred embodiment of the present invention.
Figure 3:
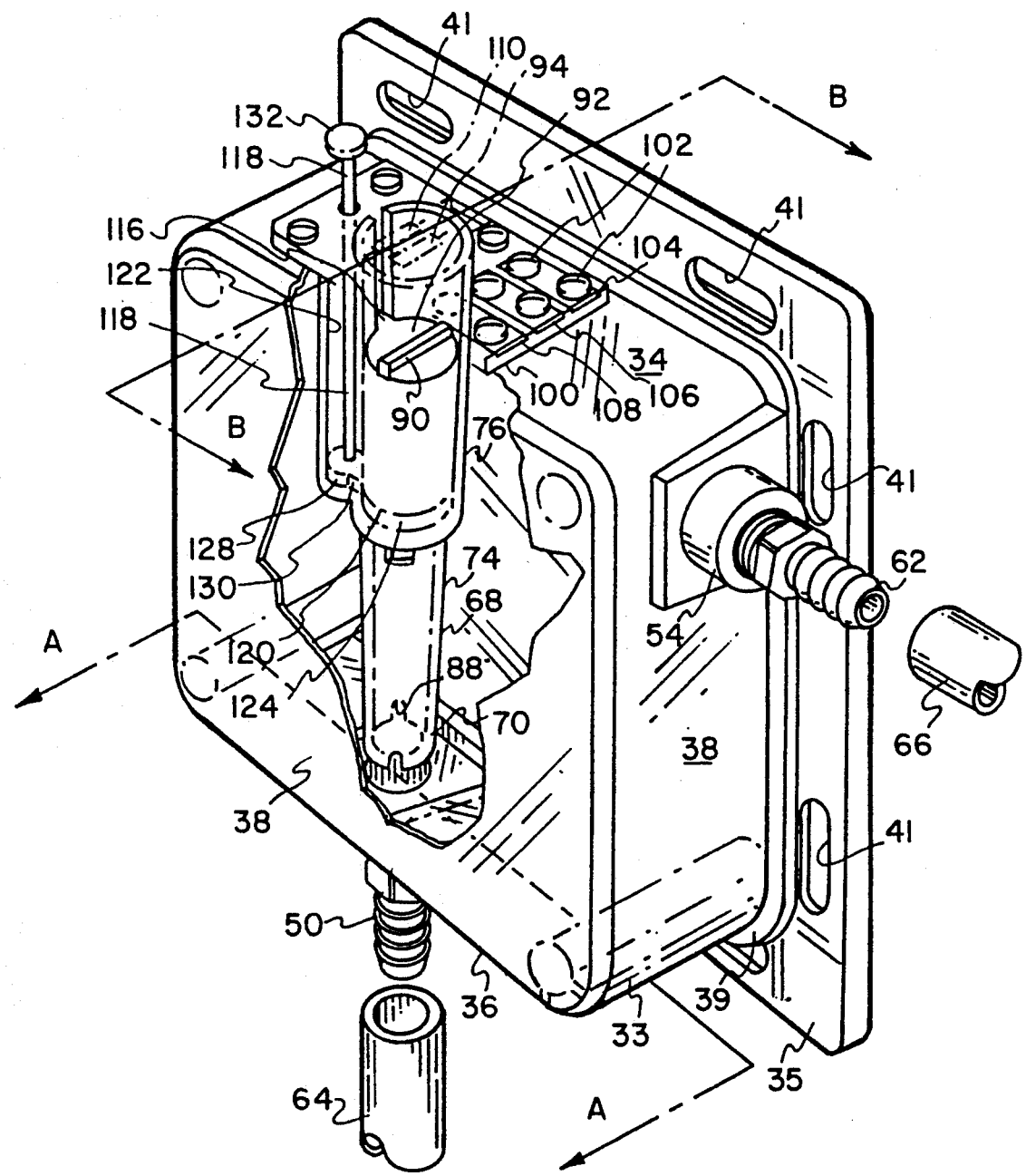
FIG. 3 illustrates a perspective view of the preferred embodiment of the present invention shown in FIG. 2 with portions broken away and other portions shown in phantom (dashed line)

In accordance with the pollution control apparatus of the present invention, a means is provided for preventing liquid fuel from the fuel tank from being transmitted directly to the overboard vent via the fuel tank vent line. The fuel transmission preventing means provides a means for intercepting and housing fuel that overflows from the fuel tank chamber when the fuel tank is being filled past the capacity of the fuel tank chamber or when excessive heat causes the volume of fuel in a full tank to expand past the capacity of the fuel tank chamber. As embodied herein and shown in FIGS. 1–6D for example, the fuel transmission preventing means preferably includes an enclosed compartment 32 for receiving and containing fuel. As depicted in FIGS. 2 and 3 for example, compartment 32 appears to be formed of transparent material. However, compartment 32 can be formed of material that is either transparent or material that is opaque, as desired. As embodied herein and shown in FIGS. 2–5 for example, compartment 32 defines a top wall 34, a bottom wall 36, and a side wall 38 connecting top wall 34 and bottom wall 36. The rectangular shape of compartment 32 is arbitrarily chosen, and other shapes would function equally well.

As shown in FIGS. 2–5 for example, compartment 32 can be formed of a molded unitary front plate 33 and a unitary flat back plate 35. In this type of configuration of compartment 32, front plate 33 encompasses top wall 34, bottom wall 36, and three side walls 38. Back plate 35 forms the remaining fourth element of side wall 38 and is connected to front plate 33 by screws (not shown) received in threaded openings 37 (shown in FIG. 5 for example) disposed near each corner of front plate 33. A fuel impermeable rubber gasket 39 can be disposed around the interface between front and back plates 33, 35 to assure a seal that is impermeable to both liquid fuel and vapor fuel.

The sizing of the fuel transmission preventing means must be large enough so that the level of stored liquid fuel is away from the top of the fuel transmission means where the vapor opening is located. Thus, in sizing the fuel transmission preventing means, due regard must be given to the amount of fuel that might be pumped into the fuel transmission preventing means, during the time it takes the person who is filling the fuel tank to react to the alarm activated by the fuel overflowing from the fuel tank and eventually entering the fuel transmission preventing means. Desirably, compartment 32 holds approximately one liter of fuel.

The fuel transmission preventing means has an inlet that communicates with the fuel tank via the vent line. As embodied herein, compartment 32 defines an inlet opening configured to be connected in communication with the fuel tank opening that communicates with the vent line of the fuel tank. As embodied herein and shown in FIGS. 2-6D for example, bottom wall 36 defines a fuel inlet opening 40 therethrough. As shown in FIGS. 4 and 5 for example, extending from the portion of compartment bottom wall 36 that defines fuel inlet opening 40, is a hollow, elongated cylindrical fitting 42. Fitting 42 has a plurality of screw threads 44 disposed internally along the free end thereof to receive an externally threaded end 46 of a standard cylindrical vent line adaptor 48. Desirably, opposite the externally threaded end 46 of adaptor 48, adaptor 48 has a standard multiple ribbed configuration 50 for receiving and being secured to the free end of a length of flexible conduit that forms the vent line leading to fuel tank chamber 20. Alternatively, fitting 42 can be externally threaded, and adaptor 48 can be internally threaded on one end.

In still further accordance with the pollution control device of the present invention, means are provided for venting to atmosphere the volatile vapors emanating from the fuel being stored in the fuel tank. The fuel vapor venting means preferably communicates with the interior of the fuel transmission preventing means. As embodied herein, the fuel vapor venting means includes at least one vapor opening defined in an upper portion of the fuel transmission preventing means. The vapor opening connects the interior of the fuel transmission preventing means with the atmosphere outside of the fuel transmission preventing means. Thus, vapors contained within the fuel transmission preventing means can escape the interior of the fuel transmission preventing means by passing through the vapor opening and entering the surrounding atmosphere via overboard vent 22. The fuel transmission preventing means has an outlet that communicates with the overboard vent via the vent line. As embodied herein and shown in FIGS. 4-6D for example, compartment 32 defines an outlet opening 52 configured to be connected in communication with the overboard vent that communicates with the atmosphere. In the illustrated embodiment, side wall 38 defines a vapour outlet opening 52 therethrough. However, the vapour outlet opening could be defined in another upper portion of the fuel transmission preventing means, if desired As shown in FIG. 4 for example, extending from the portion of compartment side wall that defines vapour outlet opening, is a hollow, elongated cylindrical fitting 54. Fitting 54 has a plurality of screw threads 56 disposed internally along the free end thereof to receive an externally threaded end 58 of a standard cylindrical vent line adaptor 60. Desirably, opposite the externally threaded end 58 of adaptor 60, adaptor 60 has a standard multiple ribbed configuration 62 for receiving and being secured to the free end of a length of flexible conduit forming vent line 24 leading to overboard vent 22. Alternatively, fitting 54 can be externally threaded, and adaptor 60 can be internally threaded on one end. In addition, the size of outlet opening 52 gradually reduces to the inside diameter of adaptor 60.

The pollution control apparatus of the present invention can be mounted by mechanical fastening means such as screws or clamps to the side of the hull or at another suitable position on the boat. As shown in FIGS. 2 and 3 for example, a plurality of installation slots 41 are disposed around the periphery of back plate 35 and defined through plate 35 for receiving mechanical fasteners that can be used to attach compartment 32 to the boat. The fuel transmission preventing means of the pollution control apparatus of the present invention desirably should be installed as close to the boat's fuel tank overboard vent as is possible. The inlet at the bottom wall 36 of compartment 32 should be placed about ten inches above the highest point on the top of the boat's fuel tank to which the fuel pollution control apparatus of the present invention is connected. As shown in FIG. 1 for example, the bottom wall of compartment 32 is disposed about 10 inches above the position where vent line 24 is attached to fuel tank 18.

In accordance with the present invention, vent line means can be provided for providing a path of communication between the interior of the fuel tank chamber and the fuel transmission preventing means and between the fuel transmission preventing means and the fuel tank overboard vent. As embodied herein and shown in FIGS. 1 and 3 for example, the vent line means desirably includes a first length 64 of flexible hose having one end connected to the fuel tank chamber and an opposite end configured to be connected to the pollution control apparatus of the present invention. One end of first length 64 of flexible fuel line vent tubing connects to multiple ribbed configuration 50 of inlet adaptor 48, and the opposite end connects to the fuel tank. The vent line means can include a second length 66 of flexible hose, which has a first end connected to the overboard vent 22 of the marine craft. A second end of the second length 66 of hose is configured to be connected to the pollution control apparatus of the present invention. As shown in FIG. 1 for example, second length 66 of fuel line vent tubing connects to outlet adaptor 60 on one end and to overboard vent 22 on the other end.

Such hose connections to the fuel transmission preventing means desirably are effected for permanent attachment, such that they only would be detached to replace a hose that had deteriorated and sprung leaks for example. However, such connections can be effected for temporary attachment, such as during the fueling process of a particular fuel tank. In another manner of using the present invention, a separate pollution control apparatus 10 can be provided for each overboard vent 22 and remain connected thereto regardless of whether the fueling operation is being carried on. According to this latter arrangement, the pollution control apparatus is always in a ready and operable condition.

In further accordance with the pollution control apparatus of the present invention, a means is provided for detecting fuel in the fuel transmission preventing means. The fuel detecting means desirably can be disposed at least partially within the fuel transmission preventing means. The fuel detecting means desirably acts as a deflector of fuel entering the fuel transmission preventing means. As embodied herein and shown in FIGS. 2-6D for example, the fuel detecting means desirably includes a hollow elongated fuel guide tube 68 disposed within the fuel transmission preventing means. One end 70 of guide tube 68 is open and disposed in communication with inlet 40 of the fuel transmission preventing means. Thus, the fuel entering the fuel transmission preventing means via inlet 40, immediately encounters and is directed into, guide tube 68. Moreover, the guide tube defines at least one exit opening 72 for permitting fuel entering the guide tube to exit the guide tube and be received within the fuel transmission preventing means. Desirably, the exit openings are disposed intermediate along the length of the guide tube.

As shown in FIGS. 2-5 for example, guide tube 68 can define a hollow, cylindrical tube having a first stage 74 disposed in-line and end-to-end with a second stage 76, which appears to telescope around one end of first stage 74. First stage 74 defines an opening 70 at the free first end thereof. Desirably, guide tube opening 70 is configured and disposed above and concentric with inlet opening 40 of compartment 32. As shown in FIGS. 2-5 for example, the transverse cross-sectional shape of first stage 74 is circular, but other shapes could be used, as desired. Near the end of first stage 74 disposed closest to second stage 76, a plurality of exit openings 72 are defined to permit fuel which enters opening 70 at the free end of first stage 74, to exit first stage 74 and enter the main reservoir of compartment 32. As shown in FIGS. 2-5 for example, exit openings 72 define circumferentially extending slotted openings, but other shapes can be used as desired.

Second stage 76 can form a unitary structure with first stage 74, but desirably is merely integral with first stage 74 and connected thereto by mechanical or adhesive means for example. As shown in FIGS. 2-5 for example, second stage 76 defines a hollow tube with an opening at one end that is connected to and against top wall 34 of compartment 32. The transverse cross-sectional shape of second stage 76 is circular, but other shapes could be used as desired. The inside diameter of the transverse cross-section of second stage 76 desirably is larger than the inside diameter of the transverse cross-section of first stage 74. The inside diameter of the transverse cross-section of second stage 76 desirably is equal to or greater than the outside diameter of the transverse cross-sectional shape of first stage 74. In this way, a surge of fuel carried up first stage 74 will expand into second stage 76 rather than being constricted as it enters second stage 76. Moreover, this configuration provides a convenient resting place for a float member 78 (described below) confined within second stage 76.

As shown in FIG. 5 for example, a positioning arm 80 is disposed near bottom wall 36 of compartment 32 and extending from side wall 38 of compartment 32 and attaching to first stage 74 of guide tube 68 at a location close to inlet opening 40 defined in bottom wall 36 of compartment 32. Positioning arm 80 supports guide tube 68 in a manner that steadies and holds guide tube 68 at the desired position with respect to the alignment of the opening 70 of the free end of first stage 74 of guide tube 68 directly in line with inlet opening 40. Thus, positioning arm 80 assures that fuel entering inlet opening 40 in compartment 32 travels under its own momentum into opening 70 of first stage 74 of guide tube 68 and up into first stage 74 of guide tube 68.

As embodied herein and shown in FIGS. 3-6D for example, the fuel detecting means further desirably includes a float member 78 disposed slidably within guide tube 68. Float member 78 desirably is a light weight structure relative to the volume it occupies and can be a hollow structure. Moreover, float member 78 desirably has a density characteristic that enables float member 78 to be floatable in marine fuel with very minimal displacement of fuel so that float member 78 floats very close to the surface of a body of marine fuel in which float member 78 is disposed. As shown in FIGS. 3-6D for example, the exterior of float member 78 is configured so that float member 78 slides easily up and down within guide tube second stage 76. As shown in FIGS. 4-6D, float member 78 has a bottom 82 that is configured so as not to be able to enter first stage 74 of guide tube 68 and accordingly rests above first stage 74 of guide tube 68 under the influence of gravity when the apparatus of the present invention is properly installed in a boat. Bottom 82 of float member 78 acts to deflect fuel entering guide tube 68 and forces the entering fuel out of exit openings 72 or back down guide tube 68 toward inlet 40 in bottom wall 36 of the fuel transmission preventing means. Bottom 82 of guide tube 68 should be continuous and impermeable to marine fuel. As shown in FIG. 6B for example, excessive fuel expansion is indicated when fuel entering guide tube 68 carries float member 78 about three quarters of an inch above the resting position of float member 78 near the intersection of first stage 74 and second stage 76 of guide tube 68.

In further accordance with the pollution control device of the present invention, a means is provided for returning to the fuel tank chamber, liquid fuel which has overflowed from the fuel tank chamber and been intercepted by the fuel transmission preventing means. The liquid fuel return means preferably communicates with the fuel transmission preventing means and with the fuel tank chamber. As embodied herein and shown in FIGS. 4 and 5 for example, the liquid fuel return means preferably includes a recess 84 defined in compartment bottom wall 36 to funnel liquid fuel back into inlet opening 40 from the main reservoir chamber of compartment 32. The liquid fuel return means further includes an annular gap 86 defined between bottom wall 36 of compartment 32 and the free end of first stage 74 of fuel guide tube 68. Annular gap 86 is configured to provide for the liquid fuel inside compartment 32, unobstructed access to fuel inlet opening 40. As shown in FIGS. 3-5 for example, the open end of first stage 74 of fuel guide tube 68 defines slots 88 which elongate in the same direction as the length of first stage 74 of guide tube 68. Each slot 88 provides additional access for drainage of liquid fuel through inlet opening 40 defined in bottom wall 36 of compartment 32.

The improved marine fuel tank vent assembly of this invention can be constructed using any suitable material or combination of materials such as brass, glass, stainless steel, plastics, etc. The preferred material used in constructing the various components of the device such as compartment 32, guide tube 68, and float member 78, is fuel-impervious Lexan TM material.

In still further accordance with the fuel pollution control device of the present invention, a means is provided for signaling the detection of fuel in the fuel transmission preventing means. The fuel detection signaling means desirably is configured and disposed to operate in cooperation with the fuel detecting means. As embodied herein, the fuel detection signaling means can include a magnetic member, a magnetically actuatable electric switch, and an electric alarm circuit. As shown in FIGS. 3-6D for example, a bar magnet 90 can define the magnetic member and desirably can be carried by float member 78 at a fixed position near or by the top 92 of float member 78. As shown in FIGS. 2-6D for example (shown phantomed in dashed line in FIG. 3), the magnetically actuatable electric switch can include at least one magnetic reed switch 94 disposed near enough to guide tube 68 so as to be actuatable by the magnetic member at a predetermined location of float member 78 within guide tube 68. The electric alarm circuit can include the at least one reed switch 94 and an electric powered alarm. The circuit is configured so that actuation of the at least one reed switch provides electric power to activate the alarm. In the illustrated embodiment of the fuel detection signaling means, the electric power source is a direct current source of electricity. Such electric power source can be the electric power source carried by the marine craft or a separate electric power source provided for purposes of powering the alarm. As shown in FIG. 1 for example, an alarm 95 can be one which emits an audible signal, a visual signal or both an audible and a visual signal. As shown in FIG. 2 for example, the alarm is an electric buzzer 96 which emits an audible buzzing noise when activated.

As shown in FIG. 2 for example, the electric circuit is schematically represented and generally designated by the numeral 98. Circuit 98 desirably includes a mounting block 100 carrying electric connecting sites with electrically conducting mounting screws 102 for attaching insulated wires 101 thereto. Each of the three electrically insulated and separate terminals 104, 106, 108 of mounting block 100 can include two screw terminal sites. Circuit 98 desirably further can include a diode D1, which provides reverse polarity protection and is connected to the electrical mounting block at a first terminal 104, to which the positive terminal of the boat battery or other direct current power source is electrically connected. The negative terminal of the boat battery or other direct current power source is electrically connected to a second terminal 108 of the mounting block and is electrically connected to at least a first reed switch 94. The first terminal 104 of mounting block 100 also is electrically connected to a capacitance element C1.

In yet further accordance with the fuel pollution control device of the present invention, the fuel detection signaling means can further comprise means for electrically powering the alarm for a predetermined time after the at least one reed switch ceases to be actuated by the magnetic member. As embodied herein and shown in FIG. 2 for example, the means for electrically powering the alarm for a predetermined time after the at least one reed switch ceases to be actuated by the magnetic member, can include a first electrical resistance element R1 and a first electrical capacitance element C1 electrically connected to first electrical resistance R1 element. The first electrical resistance element and the first electrical capacitance element are electrically connected to the electric circuit so as to provide electric power to the alarm for a predetermined time after the at least one reed switch ceases to be actuated by the magnetic member. A four second RC time delay constant has been found to be suitable for use as part of the apparatus of the present invention. Moreover, the means for electrically powering the alarm for a predetermined time after the at least one reed switch ceases to be actuated by the magnetic member, also can include a transistor switch Q1 and a resistance element R2. Resistance element R2 desirably can be electrically connected to transistor switch Q1 in a manner which limits the base current of transistor switch Q1. Furthermore, a second diode D2 forms part of circuit 98 electrically connected to transistor switch Q1. Second diode D2 prevents base to emitter reverse polarity in transistor switch Q1.

In still further accordance with the fuel pollution control device of the present invention, the fuel detection signaling means can further comprise at least a second reed switch disposed near enough to the guide tube so as to be actuatable by the magnetic member at a predetermined location of the float member within the guide tube. As embodied herein and shown in FIGS. 1–6D for example, a second reed switch 110 forms part of the electric circuit so that actuation of either of the at least one reed switch 94 or second reed switch 110 causes the electric power source to activate the alarm. The two reed switches 94, 110 are electrically connected in parallel in circuit 98. One electric terminal of each of the reed switches is electrically connected to an intermediate terminal 106 of mounting block 100 and connected electrically to a resistance R3, which limits the discharge current of capacitor C1 and thereby protects the contacts of each of the reed switches 94, 110 from arcing. Each reed switch desirably has a rated capability of 40,000 closures.

During operation of the preferred embodiment of the present invention shown in FIG. 2 for example, the proximity of the magnetic element to either of reed switches allows the magnetic field of the magnetic element to close one or both reed switches and thus render them conductive of electricity. The provision of two reed switches is done for the sake of redundancy and reliability. As shown in FIG. 2 for example, since both reed switches are electrically connected in parallel, when either reed switch closes, capacitance element C1 discharges and turns on transistor switch Q1. When transistor switch Q1 is turned on, transistor switch Q1 switches and the plus side of the battery becomes connected to the alarm, such as buzzer 96. The alarm continues to be activated and continues to emit a signal perceivable by the operator until the reed switches both open and capacitance element C1 charges. When capacitance element C1 has charged, transistor switch Q1 is turned off, and the plus side of the battery is no longer connected to power the alarm. Thus, in the embodiment shown in FIG. 2 for example, buzzer 96 ceases emitting a buzzing noise audible to the operator.

For reasons of safety, the pollution control apparatus of the present invention excludes electrical components from inside the compartment and does not include any sparking components. As shown in FIGS. 2 and 3 for example, mounting block 100 desirably is connected mechanically to the outside surface of top wall 34 of compartment 32. The reed switches are completely enclosed in a glass capsule filled with nitrogen gas.

In further accordance with the present invention, a means is provided to maintain the proper alignment of the magnetic field of the magnetic member so as to ensure reliable activation of magnetic reed switches upon nearing same. As embodied herein and shown in FIGS. 3 and 4 for example, the magnetic alignment means is provided wherein guide tube 68 desirably further defines an elongated slot 114 and a detent 116 confined within the elongated slot. The detent desirably is carried on the outside surface of float member 78. The detent and elongated slot desirably are configured and disposed for ensuring the proper alignment of the magnetic member relative to the at least one reed switch and the second reed switch. As shown in FIGS. 3 and 4 for example, an elongated slotted opening 114 extends the length of second stage 76 of guide tube 68 through the side wall of second stage 76 of guide tube 68. Alternatively, the alignment means could be provided wherein second stage 76 of guide tube 68 and float member 78 each defines a polygonal transverse cross-section rather than a circular transverse cross-section.

In accordance with the present invention, a means is provided for testing the operativeness of the fuel detection signaling means. As embodied herein, the means for testing the operativeness of the fuel detection signaling means desirably includes a lifting arm connected to the float member for lifting the float member to the predetermined location where the fuel detection signaling means should activate a signal if operative. As embodied herein and shown in FIGS. 3–6D for example, the lifting arm desirably includes an elongated plunger member 118 connected to float member 78 by a carriage member 120 which is disposed beneath the bottom surface 82 of float member 78 and is slidably disposed within second stage 76 of fuel guide tube 68. As shown in FIGS. 2–4 for example, a guide channel 122 extends along the length of one side of second stage 76 such that elongated slotted opening 114 connects guide channel 122 and second stage 76 of guide tube 68. As shown in FIGS. 3 and 4 for example, carriage member 120 defines a first portion 124 slidably confined within second stage 76 of guide tube 68.

As shown in FIG. 4 for example, first portion 124 of carriage member 120 defines an opening 126 therethrough that is large enough to allow passage of liquid fuel between the first and second stages of guide tube 68, but small enough to prevent float member 78 from passing therethrough. Desirably, opening 126 is concentric with and the same size as the opening within first stage 74 of guide tube 68. First portion 124 of carriage member 120 is configured to rest atop the end of the guide tube first stage that is disposed near to the second stage of the guide tube.

As shown in FIGS. 3 and 4 for example, carriage member 120 further defines a second portion 128 slidably confined within guide channel 122. One end of plunger member 118 is secured to second portion 128 of carriage member 120. Carriage member 120 also defines an intermediate portion 130 slidably confined within slotted opening 114 and connecting first portion 124 with second portion 128. While carriage member 120 could be made integral with float member 78, the weight considerations that pertain to the float member, dictate that carriage member 120 preferably constitutes a separate structure that is not attached to float member 78.

As shown in FIGS. 2–6D for example, one end of plunger 118 desirably extends through top wall 34 of compartment 32 and terminates in a knob 132 formed at the free end thereof. As shown in FIG. 4 for example, an O-ring member 134 is located over the opening in top wall 34 through which plunger 118 extends. O-ring member 134 is formed desirably of rubber material and provides sufficient frictional force against plunger 118 relative to the weight of plunger 118, carriage member 120, float member 78, and magnetic member 90, so that once the lifting arm is manually positioned at an elevated position above its resting position (at the bottom of second stage 76 of guide tube 68), the lifting arm remains frictionally held at this elevated position by the frictional forces provided between O-ring 134 and plunger 118. O-ring 134 also prevents fuel from escaping outside the fuel transmission preventing means through the opening provided for plunger member 118.

In operation, the fuel pollution control apparatus of the present invention is designed to respond to a sudden surge of fuel, as might occur during filling of the fuel tank beyond capacity. As shown in FIG. 6B for example, a sudden surge of a slug of fuel 140 travels through the vent line into compartment 32 via inlet opening 40 and enters first stage 74 of fuel guide tube 68. The slug of fuel continues to travel upwardly in the direction indicated by a first arrow 136 and passes through the opening 126 in first portion 124 of carriage member 120, whereupon, as indicated by a second arrow 138, the slug of fuel strikes bottom 82 of float member 78. Impact of the slug of fuel against bottom 82 of float member 78 carries float member 78 upward for about three quarters of an inch (as indicated by arrow 144 in FIG. 6B), whereupon the magnetic member 90 is disposed sufficiently close to one or both magnetic reed switches 94, 110 to close same and activate the alarm. As soon as the operator perceives the alarm, the operator knows that fuel is entering the fuel transmission preventing means, and the operator stops pouring fuel into fuel tank 18.

Different operators will have different response times to the perception of the alarm. When float member 78 is carried as far as it can go within second stage 76 of fuel guide tube 68 by the slug of fuel, the slug of fuel 140 will be forced out of exit openings 72 as shown in FIG. 6B and into the interior of compartment 32. Exit openings 72 are disposed sufficiently far away from outlet opening 52 so as to prevent direct transport of the fuel out of outlet opening 52 and into the fuel vent line connected to overboard vent 22. Some of the slug of fuel may travel back down first stage 74 of fuel guide tube 68 and drain through inlet opening 40 back into fuel tank chamber 20 via fuel vent line 24.

In addition, the fuel pollution control apparatus of the present invention is designed to operate in response to a gradual increase in the volume of fuel occupying the fuel tank, as might occur during heat expansion of the fuel in a fuel tank already filled to capacity. Operation of the pollution control apparatus of the present invention proceeds similarly whether a steady rise in the level of fuel in the fuel tank occurs by overfilling or heat expansion of the fuel. In such case, shown schematically in FIG. 6C for example, the overall level of fuel within compartment 32 slowly increases (indicated by the arrow 146) until the fuel level reaches bottom 82 of float member 78 and carries float member 78, according to the well known principle of Archimedes, upward a distance of about three quarters of an inch. Once again, the magnetic member 90 then is sufficiently near at least one of the reed switches 94, 110 to activate at least one reed switch, which in turn activates the alarm.

As shown schematically in FIG. 6C for example, when fuel gradually fills compartment 32 defining the fuel transmission preventing means, the fuel eventually can cover exit holes 72, and the rising float member 78 compresses the air that exists between compartment top wall 34 and top 92 of float member 78. The resulting pressurization of this space inside guide tube 68 above float member 78, could prevent magnet 90 atop float member 78 from approaching near enough to reed switches 94, 110 to actuate at least one of the reed switches before fuel exits compartment 32 and over board vent 22. In order to guard against this unwanted phenomenon, in further accordance with the pollution control device of the present invention, the fuel detecting means can further desirably include a means for equalizing the pressure within guide tube 68 and the interior of compartment 32 defining the fuel transmission preventing means. As embodied herein, the pressure equalizing means can include a pressure release opening defined in the upper region of one of the walls defining guide tube second stage 76. As embodied herein and shown in FIG. 4 for example, the pressure equalizing means can include a pressure release opening 79 defined in the upper region of one of the walls defining guide channel 122, which forms part of the upper region of second stage 76 of guide tube 68. Pressure release opening 79 also could be formed in another portion of the upper region of second stage 76 of guide tube 68, so long as this portion was sufficiently near top wall 34 that it would not be covered (either by fuel or float member 78) before magnet 90 would be close enough to actuate reed switch(es) 94 and/or 110.

The fuel entering the fuel transmission preventing means includes both liquid and vapor. As shown schematically in FIG. 6D for example, the liquid fuel falls to bottom wall 36. Once fuel ceases to enter compartment 32 via inlet opening 40, the liquid fuel already inside compartment 32 can drain under the influence of gravity, as indicated by the direction of arrows 142, and eventually exit the fuel transmission preventing means via fuel inlet opening 40 provided at the place where fuel guide tube 68 is disposed near bottom wall 36. This configuration of the present invention permits overflowed liquid fuel to return to fuel tank 18 via fuel inlet opening 40, and fuel tank chamber vent line 24, rather than discharging out into the waterway through overboard vent 22. The fuel vapor residing inside the fuel transmission preventing means must turn at least 180°, in order to exit the fuel transmission preventing means via vapor opening 52 and pass into the atmosphere after exiting the marine craft through overboard vent 22. As the vapor makes each turn in this path, any entrained liquid fuel is spun out of the vapor path under the influence of centrifugal force as the vapor makes these turns. Accordingly, liquid fuel does not escape into the environment to pollute same.

Testing the pollution control apparatus for readiness and operativeness can be effected as schematically illustrated in FIG. 6A for example. Knob 132 atop one end of plunger 118 can be grasped and pulled upwardly. Since the opposite end of plunger 118 is connected to a lifting element such carriage member 120, which carries float member 78, float member 78 moves upwardly until attaining a position about three quarters of an inch from the normal resting place of float member 78 at the bottom of second stage 76 and atop carriage member 120. If the pollution control apparatus of the present invention is operative, this movement of plunger 118 should cause activation of the alarm. If the alarm is not activated, then the operator knows that a malfunction has occurred and can begin trouble shooting the cause of the malfunction. If the alarm activates, then the pollution control apparatus of the present is fully functional, and the plunger can be lowered back to its resting position to carry the float back down to the resting position of the float.

What is claimed is:

1. An apparatus for controlling polluting discharges of fuel from the fuel tank of a marine craft that is powered by an internal combustion engine, that has a vent line connecting the fuel tank to a vent which communicates to the atmosphere, and that has an electric power source, the pollution control apparatus comprising:

a) means for preventing fuel from the fuel tank from being transmitted directly to the vent, said fuel transmission preventing means having an inlet that communicates with the fuel tank via the vent line, said fuel transmission preventing means having an outlet that communicates with the vent via the vent line;

b) means for detecting fuel in said fuel transmission preventing means, said fuel detecting means being disposed in said fuel transmission preventing means; and c) means for signaling the detection of fuel in said fuel transmission preventing means, said fuel detection signaling means being connected to said fuel detecting means, wherein said fuel detecting means includes:

d) a hollow elongated fuel guide tube disposed within said fuel transmission preventing means, on end of said guide tube being open and disposed in communication with said inlet of said fuel transmission preventing means; and e) a float member disposed slidably within said guide tube.

2. An apparatus as in claim 1, wherein said fuel detection signaling means includes:

a) magnetic member carried by said float member;

b) at least one magnetic reed switch disposed near enough to said guide tube so as to be actuatable by said magnetic member at a predetermined location of said float member within said guide tube; and c) an electric circuit including said at least one reed switch and an electric powered alarm, said circuit being configured so that actuation of said at least one reed switch activates said alarm by the electric power source.

3. An apparatus as in claim 2, wherein said fuel detection signaling means further comprises:

means for electrically powering said alarm for a predetermined time after said at least one reed switch ceases to be actuated by said magnetic member.

4. An apparatus as in claim 3, wherein said means for electrically powering said alarm for a predetermined time after said at least one reed switch ceases to be actuated by said magnetic member, includes:

a) a first electrical resistance element;

b) a first electrical capacitance element electrically connected to said first electrical resistance element; and c) wherein said first electrical resistance element and said first electrical capacitance element are electrically connected to said electric circuit so as to provide electric power to said alarm for a predetermined time after said at least one reed switch ceases to be actuated by said magnetic member.

5. An apparatus as in claim 2, wherein said fuel detection signaling means further comprises:

at least a second reed switch disposed near enough to said guide tube so as to be actuatable by said magnetic member at a predetermined location of said float member within said guide tube, said second reed switch forming part of said electric circuit so that actuation of either of said at least one reed switch or said second reed switch activates said alarm by the electric power source.

6. An apparatus as in claim 1, wherein:

said guide tube defines at least one exit opening for permitting fuel entering said guide tube to exit said guide tube and be received within said fuel transmission preventing means.

7. An apparatus as in claim 2, further comprising:
means for testing the operativeness of said fuel detection signaling means.

8. An apparatus as in claim 7, wherein:
said operativeness testing means includes a lifting arm connected to said float member for lifting said float member to said predetermined location where said fuel detection signaling means should activate a signal if operative.

9. An apparatus as in claim 2, further comprising:
a guide channel and a detent confined within said guide channel, said detent and guide channel being configured and disposed for ensuring the proper alignment of said magnetic member relative to said at least one reed switch.

10. An apparatus as in claim 2, wherein:
said at least one reed switch is disposed outside said fuel transmission preventing means.

11. An apparatus for controlling polluting discharges of fuel from the atmospherically vented fuel tank of a marine craft that is powered by an internal combustion engine, that has a vent line connecting the fuel tank to a vent which communicates to the atmosphere, and that carries an electric power source, the pollution control apparatus comprising:
a) an enclosed compartment for receiving and containing fuel, said compartment defining an inlet opening configured to be connected in communication with the fuel tank opening that communicates with the vent line of the fuel tank, said compartment defining an outlet opening configured to be connected in communication with the vent that communicates with the atmosphere;
b) a hollow elongated fuel guide tube disposed within said compartment, one end of said guide tube being open and disposed in communication with said inlet opening of said compartment;
c) a float member disposed slidably within said guide tube;
d) a magnetic member carried by said float member;
e) at least one reed switch disposed near enough to said guide tube so as to be actuatable by said magnetic member at a predetermined location of said float member within said guide tube;
f) an electric circuit including said at least one reed switch and an electric powered alarm, said circuit being configured so that actuation of said at least one reed switch activates said alarm by the power source.

12. An apparatus for controlling polluting discharges of fuel from the fuel tank of a marine craft, the pollution control apparatus comprising:
a) a hull floatable in water;
b) an internal combustion engine supported by said hull for propelling same through the water;
c) at least one fuel tank for storing the liquid fuel to be consumed by said engine, said tank being supported by said hull and defining a fuel tank chamber where the fuel is to be stored;
d) a fuel tank vent carried by the hull to vent said fuel tank chamber to atmosphere;
e) vent line means for providing communication via an enclosed passageway between the interior of said fuel tank chamber and said fuel tank vent;
f) means for preventing fuel from the fuel tank from being transmitted directly to the vent, said fuel transmission preventing means having an inlet that communicates with the fuel tank via said vent line means, said fuel transmission preventing means having an outlet that communicates with the vent via said vent line means;
g) means for detecting fuel in said fuel transmission preventing means, said fuel detecting means being disposed in said fuel transmission preventing means; and
h) means for signaling the detection of fuel in said fuel transmission preventing means, said fuel detection signaling means being connected to said fuel detecting means, wherein said fuel detecting means includes:
i) a hollow elongated fuel guide tube disposed within said fuel transmission preventing means, one end of said guide tube being open and disposed in communication with said inlet of said fuel transmission preventing means; and
j) a float member disposed slidably within said guide tube.

* * * * *